ANDREW O'NEILL, OF PORTSMOUTH, OHIO.

Letters Patent No. 88,660, dated April 6, 1869.

IMPROVED MODE OF PREPARING SHEET-COPPER FOR BOILERS AND OTHER VESSELS.

The Schedule referred to in these Letters Patent and making part of the same.

*To all whom it may concern:*

Be it known that I, ANDREW O'NEILL, of Portsmouth, in the county of Scioto, and State of Ohio, have invented a new and useful Improvement in the Preparation of Sheet-Copper for Boilers and other Vessels; and I do hereby declare the following to be a sufficiently full, clear, and exact description of my said invention, to enable one skilled in the art to which it appertains, to carry it into effect.

My invention relates to a cheap, durable, and greatly improved mode of preparing tinned copper for the sides or bodies of wash-boilers and other culinary vessels.

The object of my invention is to prepare for market tinned copper sheets, with smooth, and uniform, and permanently-lustrous surfaces, without artificial coloring.

Sheets of tinned copper as now usually prepared for pot-bodies, acquire a discolored, stained, and mottled appearance by the oxygenating agency of the heat and acids employed in the process of tinning, and to these causes of disfigurement there is often added that arising from the overflow of the tin itself on to the copper side. This disfigurement is now sought to be removed by acids, which, in turn, "cut" the tin, and initiate rust, and by tedious and costly mechanical abrasion, which consumes much time and material.

In consequence of the above, it is frequently necessary to retin the interior of the vessels after they are made up, which reproduces the evils above alluded to.

To the above evils there is commonly added that of unevenness of tinned surface due to hand-planishing or striping, the tin being found to wear rapidly away from the ridges or eminences.

Sheets prepared under my process are protected from the tarnishing effect of the perspiration of the workman's hands, in making the boilers, or other vessels, and are entirely free from the ridges or eminences which commonly exist on the inside of tinned copper sheets prepared in the usual way.

Without any costly preparation, a smooth uniform surface is imparted to both sides of the sheets.

The enamel hereinafter described brings out and retains the natural color of the copper with great brilliance, and adheres so closely and securely to the surface, as to avoid any liability to peel in grooving, or swaging, or separate under the process of soldering seams, &c.

Sheets of copper thus prepared, present on their enamelled or exterior side, a hard, glossy, bright surface, of natural and enduring color.

The tinned surface not having been subjected to the usual disfigurement from rough handling, and sweaty contact of the professional planisher, and having been intimately united to the copper, and reduced to a hard, even, and lustrous surface under the heavy pressure of the polishing-rolls, has a better and more merchantable appearance, and more permanent brilliancy, while the superior stiffness and elasticity of the sheet preserves it from denting or bruising.

My process is as follows:

I provide copper sheets, of the precise size required to compose the body of the wash-boiler, or other desired vessel, and having tinned them by the usual, or any approved process, I pass them through highly polished chilled, or steel rolls, and cold-roll the sheets. Then they are placed upon an endless apron, or carrier, and passed beneath a rotary polishing-wheel, or buffer, to produce a high gloss, or they may be polished by any other approved or preferred mode.

I prepare two quarts of dammar varnish, one quart of turpentine, one quart of alcohol, to make one gallon of the transparent enamel. Then lay the sheets, with the bright sides up, on a steam-table, which is kept at a moderate temperature to warm the sheets. Then I apply the transparent enamelling with a soft, flat brush, and when dry the sheets are ready for market.

Having thus described my invention,

The following is what I claim as new therein, and desire to secure by Letters Patent—

1. I claim a bright cold-rolled tinned sheet of copper, as explained.

2. I claim a transparent enamelled, bright-tinned cold-rolled sheet copper.

3. As a new article of manufacture, the polished and enamelled tinned copper-sheet, produced by the process substantially as herein described, for the manufacture of wash-boilers, and other culinary vessels.

ANDREW O'NEILL.

Witnesses:
J. J. GIST, Jr.,
JOHN LENHART.